JAMES J. DENARO
FREDERICK W. MACONE
INVENTORS.

BY Robert L. Nathans

ATTORNEY.

United States Patent Office 3,520,756
Patented July 14, 1970

3,520,756
LAMINATING MACHINE
James J. Denaro, Concord, and Frederick W. Macone, Carlisle, Mass., assignors to Avant Corporation, Lincoln, Mass., a corporation of Massachusetts
Filed Apr. 19, 1967, Ser. No. 631,961
Int. Cl. B32b 31/00
U.S. Cl. 156—583                                   25 Claims

ABSTRACT OF THE DISCLOSURE

This disclosure illustrates a machine for sequentially, heating a composite sheet to be laminated, thereafter applying laminating pressure, and then maintaining the laminated sheet or card flat during cooling to prevent curling. The composite plastic sheet or card is placed on a heat resistant belt. The belt is positioned between a pair of arcuate platens which are mounted upon a movable carriage along with a heating element. The heater, mounted on the movable carriage, is positioned over the card to be laminated to heat it and the platens are thereafter actuated to cause the carriage to translate with respect to the card thereby to apply laminating pressure to the card. The card is stationary with respect to the frame of the machine and the heater together with the arcuate platens sequentially operate on the stationary card. Thus lamination is easily effected by an unskilled operator and the machine is simple and relatively inexpensive to manufacture and therefore is suitable for low volume card lamination.

Figure 1:
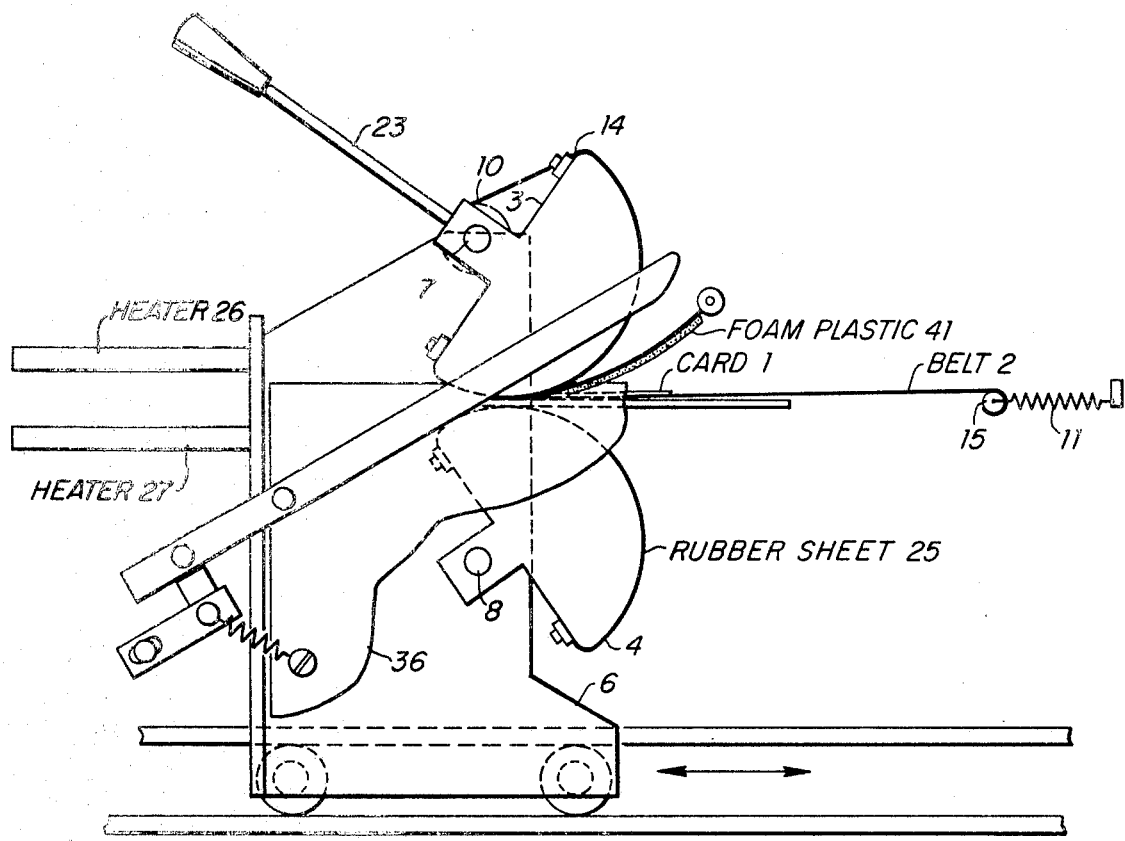

The present invention relates to a new and improved laminating machine.

BACKGROUND OF THE INVENTION

A common machine for laminating cards involves the intermittent feeding of data cards between two plastic webs which are continuously fed from supply rolls and into the bite of a pair of heating rolls which applies laminating heat and pressure. This type of machine suffers from a large number of drawbacks. At present two 100' rolls of plastic for laminating I.D. cards cost seventy dollars. Since the plastic webs are fed continuously, the operator must keep feeding the cards at a rapid rate. If the cards are fed too fast, insufficient room exists between cards for proper subsequent diecutting to be carried out as a minimum spacing is required between data cards. If the cards are fed too slowly, to assure adequate spacing of the data cards, expensive plastic is wasted, 50% wastage being typical. If a card is inserted so that it lies beyond an edge of a plastic web, the data card is ruined and must be remade. If the card is inserted at an angle, the diecutter often cannot accommodate the card and laborious and expensive trimming by hand must be resorted to. If the roller webs are misaligned or mismatched widthwise, the rolls become gummed and the cleaning of a gummed roll is tedious and time consuming. If the web feed velocity is too high, the rolls may lose excessive heat, the temperature drops, and insufficient bonding results. Improper threading of the plastic webs so that the wrong side of the plastic is exposed to the heat rolls also produces gumming. The plastic leader required for threading, together with rippling of the plastic when the machine is stopped, produces waste. Reloading of rolls and threading of the leader is tedious, while the operator must wait a half hour or so for the heat rolls to cool before reloading. Fingers are often burned on the heat rolls.

Laminators utilizing flat, heated platens have poor heat control and readily produce melted cards. Cards also commonly curl and/or stick to the platens and control of the cards is difficult. Automated machines have been used which employ complex turrets and elaborate means to alternately heat and cool the platens which sharply reduces the production rate of laminated cards.

There is at present a definite need for a simple and economical machine that may be easily operated by unskilled individuals in schools and corporate or military environments, without wastage of plastic and without the aforesaid difficulties associated with the use of prior art machines.

SUMMARY OF THE INVENTION

In accordance with a preferred embodiment of the invention, a planar composite media to be laminated is supported in a predetermined position by a heat resistant spring loaded belt. A carriage, movable with respect to the belt and machine frame carries an electrical heater for heating the planar media and carries a pair of rotatable arcuate pressurizing or laminating platens which are also coupled to the frame of the machine. In the initial position the media is placed adjacent the arcuate platens and the operator actuates a handle which rotates the upper platen which causes the carriage to move translationally with respect to the media by virtue of reaction forces produced by elongated links coupling the arcuate platens to the frame. Concurrent platen rotation and displacement of the carriage causes the platens to roll over the planar media and the media is then subjected to laminating heat from the carriage mounted heater. After the heating period the operator again actuates the handle and the platens roll back over the composite media to apply laminating pressure. Further platen rotation causes the carriage to actuate a mechanical linkage which causes a flattening means to be positioned upon the laminated media during cooling to prevent curling of the card. The sequence control carriage is therefore moved back and forth to sequentially process a substantially stationary planar media to be laminated. Processing is thus accomplished in a simple, highly controlled, and straight forward manner on a "one shot" basis so that consistently good results may be produced by unskilled operators in schools, companies and in the military. Since pre-cut outer plastic sheets are utilized in place of the continuous rolls of plastic, wastage is eliminated, while the "one shot" nature of operation reduces operator strain and eliminates the aforesaid drawbacks of prior art approaches.

Figure 2:
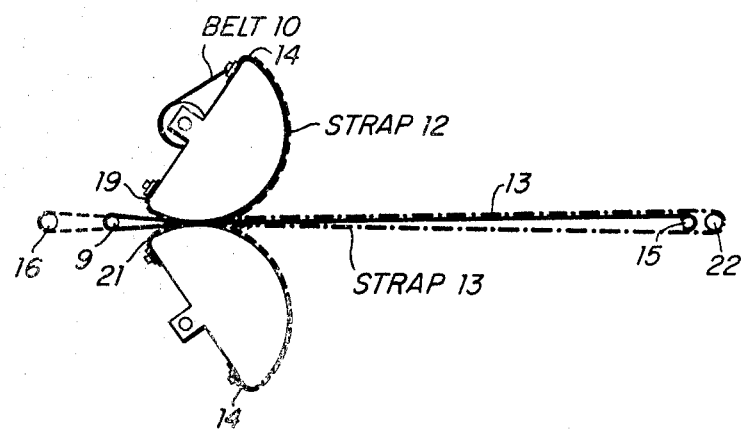
Figure 3:
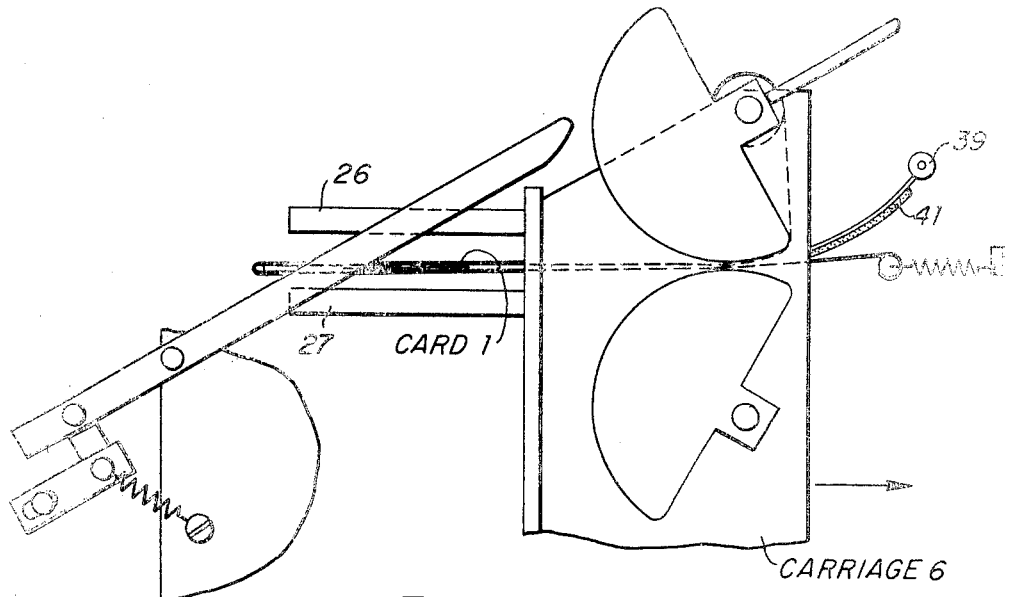
Figure 4:
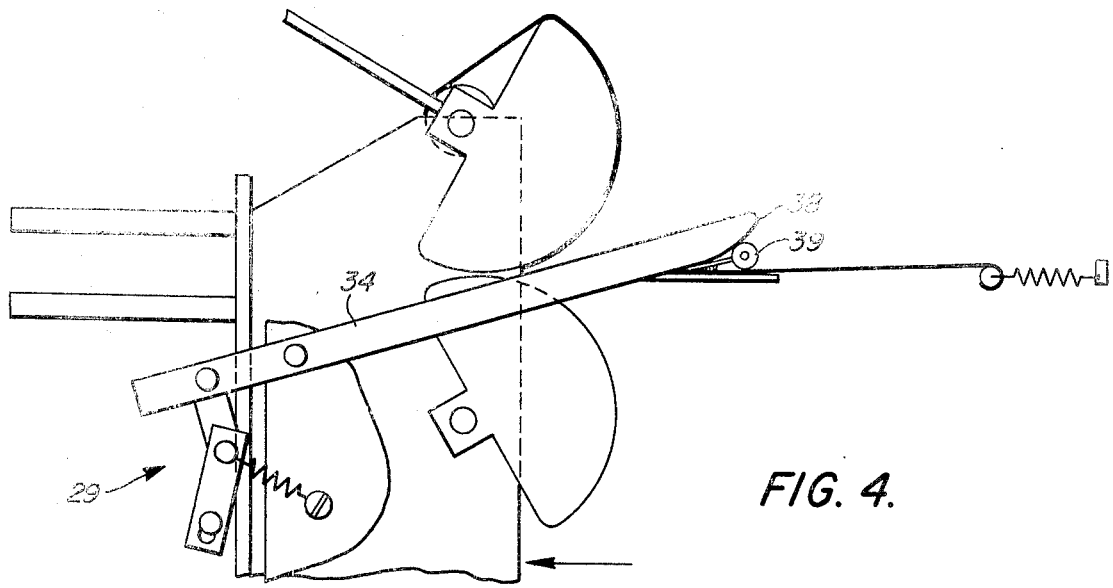
Figure 5:
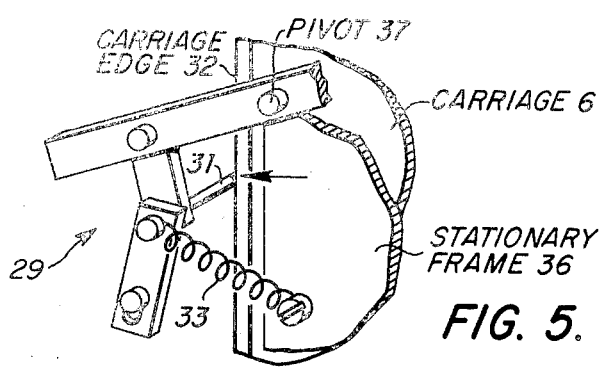

Other objects, features and advantages of our invention will become apparent upon reading the following description taken in conjunction with the drawings in which:

FIG. 1 discloses the machine with the media to be laminated in the initial position;
FIG. 2 illustrates certain details of FIG. 1;
FIG. 3 illustrates the carriage in the heating position;
FIG. 4 illustrates the carriage in the terminal position;
FIG. 5 illustrates certain details of the linkage for actuating the flattening means.

SPECIFIC DESCRIPTION

In FIG. 1, card media 1 is positioned on support belt 2 and adjacent arcuate platens 3 and 4 which are rotatably mounted on movable carriage 6 at points 7 and 8. Belt 2, illustrated as a solid black line in FIG. 2, is coupled at one end to platen 3 at point 10, passes around post 9 coupled to the frame and is spring loaded and coupled by spring 11 at point 15 to the frame as shown. The aforesaid elongated reaction links comprise narrow strap 12 represented by a dashed line in FIG. 2 and strap 13 represented by a dot-dashed line. Strap 12 is attached to the outer platen portions 14 14' and passes around post 16 attached to the frame. Strap 13 is attached to the inner portions of the platens at points 19 and 21 and passes about post 22 attached to the frame. The elongated straps apply reaction forces to the carriage such that rotation of the upper platen produces carriage translation together with rotation of the lower platen.

The operator pulls up on handle 23 which causes arcuate platens 3 and 4 to roll over the stationary media 1 and to produce translation of carriage 6 to the right as indicated in FIG. 3. Since electrical heaters 26 and 27 are attached to carriage 6 they now straddle media 1 as shown to heat the media. The heaters are in noncontacting relationship with the media and excellent heat control may be had by controlling the current and/or the heating interval and thus sticking problems together with alternate heating and cooling of prior art flat platens is avoided.

The operator now pushes on handle 23 in a counter clockwise direction to cause carriage translation to the left and to cause the platens to roll back over the now heated card to apply laminating pressure. Since the diameter of the platens are typically over 4" and the platens are covered by a somewhat soft compliant rubber layer 25, an even laminating pressure is applied while any air bubbles which might form between the plastic sheets of the planar media are eliminated by squeege action. In contrast, prior art laminating rollers, having small diameters, may produce uneven lamination since laminating pressure is applied along a "line" and any out of roundness might be critical. Large diameter platens utilizing somewhat soft compliant material such as rubber apply pressure at one time over a wider card area and potential uneveness is integrated out and averted.

Carriage 6 thus moves to the left and through the second or laminating position until carriage portion 29 pushes against portion 31 of flattener actuating means 32, which is spring biased by spring 33 of FIG. 5. This action produces clockwise rotation of arm 34, which is pivotably mounted to stationary frame member 36 at pivot point 37, to cause end portion 38 of arm 34 to push down on rod 39 affixed to flattening member 41, which typically consists of a sheet of foam plastic or the like. A second arm at the back of the machine may be utilized to readily produce balanced pressure on rod 39. After a short time the operator pulls up on handle 23 to release the flattening means 41, the card is removed, and the carriage is back in the initial position.

It is important to note that during processing the card need not be moved or otherwise manipulated and it is continuously maintained in a flat position by the belt means coacting with the platens and flattening means. Belt means 2, comprising doubled over sections, may typically consist of a heat resistant nonsticking plastic material. The aforesaid elongated links may be wrapped about outer portions or the same platen surface bearing the belt or alternatively could be affixed to a separate arcuate platen surface rotationally coupled to the arcuate platen bearing the belt.

We claim:

1. A machine having a frame for laminating a planar media comprising:
    (a) support means for supporting said media in substantially the same position with respect to said frame throughout the processing cycle which cycle includes the application of heat and laminating pressure to the media;
    (b) heating means for heating said media to a temperature to enable lamination to occur;
    (c) movable pressurizing means for applying laminating pressure to said planar media by physically moving said movable pressurizing means to said media and;
    (d) control means for sequentially exposing said media to said heating means and thereafter to said pressurizing means.

2. The combination as set forth in claim 1 further including a first frame structure;
    (a) means for coupling said media support means to said frame structure, said control means includnig a carriage movable with respect to said frame structure;
    (b) means for mounting said heating means and said pressurizing means to said carriage to cause said media to be exposed to said heating means when said carriage assumes a first position with respect to said frame and to cause said media to be pressurized and laminated by said pressurizing means when said carriage assumes a second position with respect to said frame.

3. The combination as set forth in claim 2 wherein said heating means comprises a source of radiant heat.

4. The combination as set forth in claim 2 wherein said media support means comprises an elongated belt.

5. The combination as set forth in claim 4 wherein said belt is coupled to said frame by a spring biased member.

6. The combination as set forth in claim 2 wherein said pressurizing means includes an arcuate platen and means for causing said arcuate platen to roll over said media support means to pressurize said planar media.

7. The combination as set forth in claim 6 further including coupling means for coupling said arcuate platen to said frame for producing concurrent rotation of said arcuate platen and movement of said carriage from said first position through said second position.

8. The combination as set forth in claim 7 wherein said coupling means includes an elongated mechanical link partially wrapped about said arcuate platen.

9. The combination as set forth in claim 8 wherein said elongated link comprises a strap.

10. The combination as set forth in claim 7 wherein said coupling means includes a first elongated link mounted between a first portion of said frame and a first portion of said arcuate platen and a second elongated link mounted between a second portion of said arcuate platen and a second portion of said frame separated from said first frame portion.

11. The combination as set forth in claim 2 wherein said pressurizing means includes a pair of large diameter arcuate platens straddling said media support means and means for causing said arcuate platens to simultaneously rotate and roll over said media support means.

12. The combination as set forth in claim 1 wherein said media support means comprises a pair of belt members for maintaining a composite sheet therebetween during heating and lamination.

13. The combination as set forth in claim 1 further including flattening means for maintaining said planar media in a flattened condition after said media is laminated by said pressurizing means.

14. The combination as set forth in claim 2 further including flattening means for maintaining said planar media in a flattened condition after said media is laminated by said pressurizing means and actuating means for actuating the operation of said flattening means when said carriage assumes a third position with respect to said frame.

15. The combination as set forth in claim 14 wherein said actuating means includes a linkage member for pushing down on said flattening means upon being rotated by said carriage when said carriage assumes said third position.

16. The combination as set forth in claim 1 wherein said pressurizing means includes a large diameter arcuate platen which rolls over said media support means.

17. The combination as set forth in claim 2 wherein said pressurizing means include first and second large diameter arcuate platents straddling said media support means and further including means for producing concurrent rotation of said arcuate platens and translational motion of said carriage.

18. The combination as set forth in claim 17 wherein said last named means includes a first elongated coupling member coupled between a first portion of said first platen and a first portion of said frame, a second elongated coupling member coupled between a second portion of said first platen and a second portion of said frame, a third elongated coupling member coupled between a first portion of said second platen and a third portion of said frame, and a fourth elongated coupling member coupled between a second portion of said second platen and a fourth portion of said frame.

19. The combination as set forth in claim 18 wherein said elongated coupling members comprise flat straps.

20. The combination as set forth in claim 6 including an elongated belt having one end attached to said arcuate platen and having the other end coupled to said frame and means for causing said belt to be wrapped about said platen and doubled over to produce two belt sections for receiving said planar media to be laminated during heating.

21. The combination as set forth in claim 21 including means for maintaining said belt in tension.

22. The combination as set forth in claim 16 wherein said large diameter arcuate platen is at least partially covered with a compliant material.

23. In a machine for laminating a planar media the improvement comprising:
  (a) a rotatable arcuate platen having a radius of curvature greater than two inches and including soft compliant material on the surface thereof and;
  (b) backing means mechanically biased against said arcuate platen so that a planar media passed between said arcuate platen may be subjected to even laminating pressure and squeege action to remove air bubbles.

24. The combination as set forth in claim 23 wherein said backing means includes a second rotatable arcuate platen having a radius of curvature greater than two inches and including soft compliant material on the surface thereof.

25. The combination as set forth in claim 23 further including means coupled to said arcuate platen for maintaining said planar media in a flattened condition after the actuation of said arcuate platen.

References Cited
UNITED STATES PATENTS

| | | | |
|---|---|---|---|
| 2,224,370 | 12/1940 | Wescott | 156—322 |
| 2,451,597 | 10/1948 | Wheeler | 156—322 X |
| 3,408,242 | 10/1968 | Rochla | 156—322 X |

ROBERT F. STAHL, Primary Examiner

U.S. Cl. X.R.

156—322, 99